US009745014B2

(12) United States Patent
Osanai et al.

(10) Patent No.: US 9,745,014 B2
(45) Date of Patent: Aug. 29, 2017

(54) OPERATING DEVICE OF STRADDLE TYPE VEHICLE

(71) Applicant: HONDA MOTOR CO., LTD., Tokyo (JP)

(72) Inventors: Takuya Osanai, Wako (JP); Yutaka Kikuchi, Wako (JP); Shiro Fukano, Wako (JP); Masahiro Miki, Wako (JP); Hiroshi Hayashi, Wako (JP); Kota Nakahira, Wako (JP); Tomohiro Hoshi, Wako (JP); Manabu Ichikawa, Wako (JP); Yoshitaka Suzuki, Wako (JP); Tomoyuki Takewaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 164 days.

(21) Appl. No.: 14/665,489

(22) Filed: Mar. 23, 2015

(65) Prior Publication Data
US 2015/0274242 A1    Oct. 1, 2015

(30) Foreign Application Priority Data

Mar. 25, 2014 (JP) ................................. 2014-061530

(51) Int. Cl.
| | | |
|---|---|---|
| *B62K 11/14* | (2006.01) | |
| *B60K 23/02* | (2006.01) | |
| *B60K 26/02* | (2006.01) | |
| *B62M 25/08* | (2006.01) | |
| *B62K 23/04* | (2006.01) | |

(52) U.S. Cl.
CPC ............. *B62K 11/14* (2013.01); *B60K 23/02* (2013.01); *B60K 26/02* (2013.01); *B62K 23/04* (2013.01); *B62M 25/08* (2013.01); *Y10T 74/20396* (2015.01)

(58) Field of Classification Search
CPC ........ B62K 11/14; B60K 23/02; B60K 26/02; Y10T 74/20396
See application file for complete search history.

(56) References Cited

U.S. PATENT DOCUMENTS

| | | | | |
|---|---|---|---|---|
| 2010/0059018 A1* | 3/2010 | Akatsuka | ............... | B62K 11/14 123/399 |
| 2012/0138375 A1* | 6/2012 | Hughes | .................... | B60L 7/10 180/65.1 |
| 2015/0274248 A1* | 10/2015 | Osanai | .................. | B62K 23/04 74/471 R |

FOREIGN PATENT DOCUMENTS

| | | |
|---|---|---|
| JP | 2007-530335 A | 11/2007 |
| JP | 2009-056872 A | 3/2009 |
| JP | 2010-064618 A | 3/2010 |
| JP | 2011-194993 A | 10/2011 |
| JP | 2013-189023 A | 9/2013 |
| WO | WO 2005/092698 A1 | 10/2005 |

* cited by examiner

*Primary Examiner* — Faye M Fleming
(74) *Attorney, Agent, or Firm* — Squire Patton Boggs (US) LLP

(57) ABSTRACT

An operating device of a straddle type vehicle has a controller for selecting a plurality of function menus of components mounted on the straddle type vehicle. Controller supporting portions support the controller, and are disposed in the front direction of a switch box. The controller has a controller operating portion which a rider can operate. The controller operating portion is positioned in the front direction of a grip portion.

15 Claims, 16 Drawing Sheets

OPERATING DEVICE OF STRADDLE TYPE VEHICLE

BACKGROUND

Field

The present invention relate to an operating device of straddle type vehicle which is used for equipment operation components including the audio unit or navigation system, the switching of a meter display, or the switching of the traveling mode.

Description of the Related Art

In PATENT DOCUMENT 1 (Japanese Translation of PCT International Application Publication No. JP-T-2007-530335), a configuration is proposed such that a dial type operation ring rotating around the center axis of a handle bar is installed at the inside position of the grip around the handle bar. In a straddle type vehicle, ordinarily, a switch box including one or multiple controllers operated with the rider's finger is disposed adjacent to an inside end portion of a grip of the handle bar. In PATENT DOCUMENT 1, an operation ring with a larger outer diameter than the grip is additionally provided between inside end portion of the handle bar grip and the switch box. Accordingly, when operating the controller provided on the switch box, the rider has to stretch the finger grasping the grip over the operation ring, which makes it harder to operate the controller.

In consideration of the above-mentioned problem, PATENT DOCUMENT 2 (Japanese Laid-Open Patent Publication No. 2013-189023) discloses a rotary controller which is provided in a switch box such that the rider can select the function menu for an audio unit or a navigation system which are mounted on the vehicle. Accordingly, selecting the function menu and the like becomes easier without changing the operability of the other switch in the switch box.

Moreover, it is possible to provide a predetermined controller at the place other than the switch box. In this regard, PATENT DOCUMENT 3 (Japanese Laid-Open Patent Publication No. 2011-194993) discloses a configuration in which a handle bar switch is provided for operating a blinker on a clutch lever and a brake lever in the front direction of a grip with forefinger while grasping the grip.

However, in PATENT DOCUMENT 2, a rotary controller element is additionally provided in a space among the existing switches provided on the switch box, which restricts a flexibility in the arrangement. Simultaneously, it will be necessary to consider that the rotary controller can be sensuously recognized from the other switch. Moreover, the switch box becomes larger.

Furthermore, since handle bar switch in PATENT DOCUMENT 3 is used for the simple operation such as turning on or off the blinker, the switch can be operated even if the handle switch is provided on the clutch lever and the like. However further consideration is required on the easy operability of the controller for selecting the function menu of the operating devices mounted on the vehicle.

SUMMARY

The present invention aims to keep the good operability of a switch disposed on an existing switch box and to facilitate the recognition from these switches, and to provide an operating device of straddle type vehicle for facilitating a plurality of easy operations including selecting the function menu of equipment mounted on the vehicle.

An operating device of a straddle type vehicle comprises switch box having a plurality of switches adjacently provided on the inside in the axial direction of grip portion which is provided on both right and left ends of a handle bar extending in the right and left direction of the straddle type vehicle, and which is grasped by a rider. A controller for selecting a plurality of function menus of equipment is mounted on the straddle type vehicle. A controller supporting portion supports the controller and is disposed in the front direction of the switch box. The controller has a controller operating portion which a rider can operate; the controller operating portion is positioned in the front direction of the grip portion.

In some embodiments, the one grip portion of the handle bar is an accelerator operating controller manually controlling the vehicle speed. The controller operating portion is positioned in the front direction of the other grip portion which is on the opposite side to the grip portion as the accelerator operating controller.

In some embodiments, the straddle type vehicle has a clutch lever positioned in the front direction of the other grip portion by which the rider manually operates for connecting and disconnecting transmission of the drive force of the driving source to the transmission. The controller operating portions are positioned above the clutch lever.

In some embodiments, the straddle type vehicle is a vehicle on which the rider cannot manually operate for connecting and disconnecting transmission of the drive force of the driving source to the transmission. The controller operating portions are provided in the front direction of the left grip portion of the handle bar.

In some embodiments, the straddle type vehicle shifts gears of the transmission under the instruction of the electric signal. A shift instruction switch shifts the gears by the rider's operation, below the controller operating portion, and is in the vicinity of the grip portion.

In some embodiments, the controller supporting portion is integrally provided with the switch box.

In some embodiments, the controller has a selection operating function for scrolling function menu and to the direction of proceeding with the selected function menu and to the direction of returning the selected function menu by the rider's operation to select the first operation and the second direction.

In some embodiments, the controller can operate to select the third direction other than the first and second directions and have a determination operating function which determines the selected function menu by the operation to select the third direction.

According to a first aspect of the present invention, the controller operating portion of the controller, which are used for selecting a plurality of function menus of equipment mounted on the straddle type vehicle is arranged in a position different from multiple switches provided in the switch box normally used in a straddle type vehicle. Accordingly, it is possible to prevent rider from confusing the operation for the plurality of switches with the operation for the controller operating portion. The controller operating portion is positioned in the front direction of the grip portion. Accordingly, even if the rider stretches at least one of the fingers which grasp the grip portion, the rider can control the controller operating portion while grasping the grip portion with the other finger and the palm.

According to a second aspect of the present invention, the controller operating portions are positioned in the front direction of the other grip portion which is on the opposite side to the grip portion as highly-used accelerator operating controller. Accordingly, the operation for selecting the plurality of function menus can be facilitated.

According to a third aspect of the present invention, the controller operating portions are positioned above the clutch lever. Accordingly, the rider can easily operate and easily confirm the controller operating portion despite existence of the clutch lever.

According to a fourth aspect of the present invention, the rider does not manually operate for connecting and disconnecting the drive force of the driving source to the transmission. Accordingly, there is no need to provide the clutch lever. This increases the flexibility in arrangement of the controller operating portion.

According to the fifth aspect of the present invention, the shift instruction switch is provided below the controller operating portion and in the vicinity of the grip portion. Accordingly, the shift instruction switch can be disposed such that the rider does not confuse the operation with the operation for the controller operating portion.

According to a sixth aspect of the present invention, the controller supporting portion is integrally provided with the switch box. Accordingly, the controller supporting portion is efficiently formed.

According to a seventh aspect of the present invention, the controllers has the selection operating function for scrolling the function menu to the direction of proceeding with the selected function and to the direction of returning the selected function. Accordingly, the rider can select the function menu in accordance with the rider's senses, which facilitate selecting the function menu.

According to an eighth aspect of the present invention, the controller has determination operating function which determines the selected function menu. Accordingly, the rider can determine the function menu without changing the finger which selects the function menu.

DETAILED DESCRIPTION

Hereinafter, the operating device of the straddle type vehicle according to present invention will be explained with reference to the attached drawings, by showing the preferable embodiment.

Figure 1:
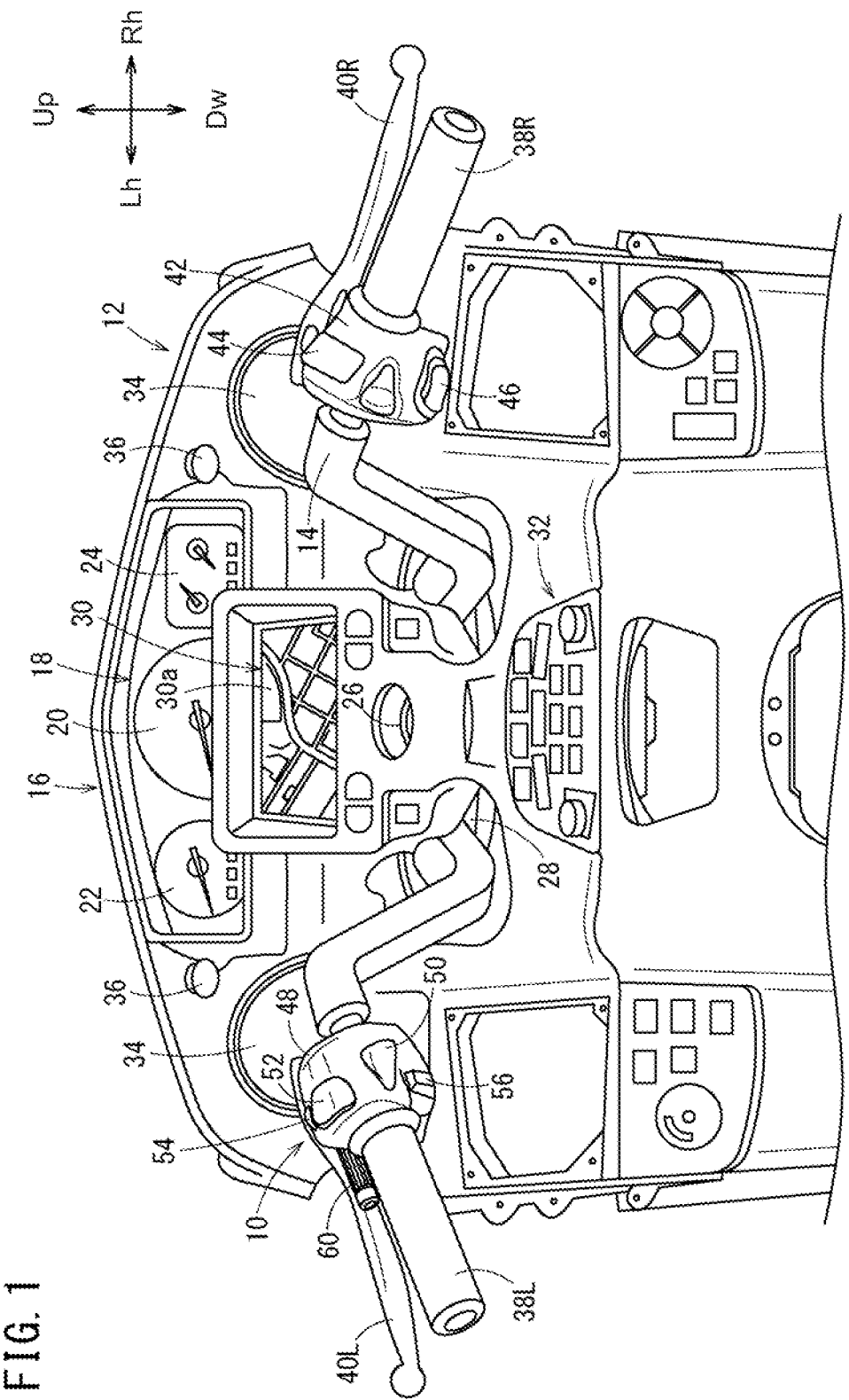
FIG. 1 is a partly enlarged view in the vicinity of the handle bar in the straddle type vehicle including a motorcycle having the operating device according to the first embodiment.

FIG. 1 is a partly enlarged view of a first embodiment in the vicinity of a handle bar 14 of a straddle type vehicle 12 including a motorcycle having the operating device 10. FIG. 1 is the downward view around the handle bar 14 as seen from the rear and the upper direction of the vehicle body and shows the approximately same state seen from the rider seated on the unillustrated seat of the straddle type vehicle 12. Moreover, the "right and left" and "upper and lower" directions will be explained by setting the travelling direction as the front, and based on the directions seen from the rider seated on the seat of the straddle type vehicle 12 if not stated otherwise.

A front cowl 16 covers the front side of the vehicle body of the handle bar 14 which steers the unillustrated front wheel of the straddle type vehicle 12, a meter device (component) 18 is disposed above and inside the front cowl 16. The meter device 18 has a tachometer 20 displaying the number of revolution of driving sources including an unillustrated engine or a motor, a speed meter 22 displaying the speed of the straddle type vehicle 12, and various instruments 24 including the fuel gauge and the like. The meter device 18 is a liquid crystal display, that is, a meter display which changes the screen displays by the rider's selection. Moreover, organic EL may be used for the display, instead of liquid crystal. Namely, the meter device 18 may be an Organic EL display.

The front wheel is rotatably and axially supported on an unillustrated right and left pair of front forks. The upper portion of the paired right and left of front forks are connected and fixed to a top bridge 28 on which a main switch 26 is installed. The top bridge 28 is rotatably installed on an unillustrated head pipe constituting a body frame through an unillustrated steering stem. The handle bar 14 is fixed on the upper portion of the top bridge 28.

A display portion 30a of a navigation system (equipment) 30 is disposed in the upper center direction of the top bridge 28 and in the rear direction of the meter device 18. An audio unit (equipment) 32 with functions including a FM/AM tuner, a digital audio player unit, and an amplifier and the like is disposed in the further rear direction side of the display portion. The display portion 30a is used for displaying a selected music by the audio unit 32 and the other function menus. Speaker units for middle and low ranges 34, 34 are disposed on the right and left of the meter equipment 18 so as to reproduce the middle-pitched sound and the low-pitched sound according to the output from the audio unit 32. Speaker units for reproducing high range 36, 36 are disposed between these speakers 34, 34 and the meter device 18.

The grip portions 38L, 38R, intended to be grasped by a rider, are attached to the both right and left end of the handle bar 14. A front wheel brake lever 40R is provided in the front direction of the right handle bar grip 38R. The front wheel brake lever 40R is a controller for applying the braking force to the front wheel by the rider's manual operation. The right handle bar grip 38R is an accelerator controller for manually controlling the speed of the straddle type vehicle 12 and is rotatably supported on the handle bar 14. A clutch lever 40L is provided on the front direction of the left handle bar grip 38L. The clutch lever 40L is a controller for connecting and disconnecting transmission of drive force of the driving source to a speed change gear (not shown) by the rider's manual operation. Namely, the operation of the clutch lever 40L disconnects transmission of drive force of the driving source to the speed change gear. The release operation of the clutch lever 40L transmits the drive force of the driving source to the speed change gear.

A switch box 42 provided inside the axial direction of the handle bar grip 38R in the axial direction so as to be adjacent to the handle bar grip 38R is provided on the right handle bar 14. Switches for various electric equipment is provided on the switch box 42. In detail, an engine stop switch 44, a starting switch 46 and the likes are provided. The engine stop switch 44 is a seesaw type switch holding the "on" side position and the "off" side position unless the operational force is applied. The engine stop switch is used for an emergency stop by switching to the off side during the operation of the driving source. The pressing type starter switch 46 is a controller for starting the engine and when a main switch 26 is turned on and the speed gear is in neutral, the operation of the starting switch 46 starts the engine.

Figure 2:
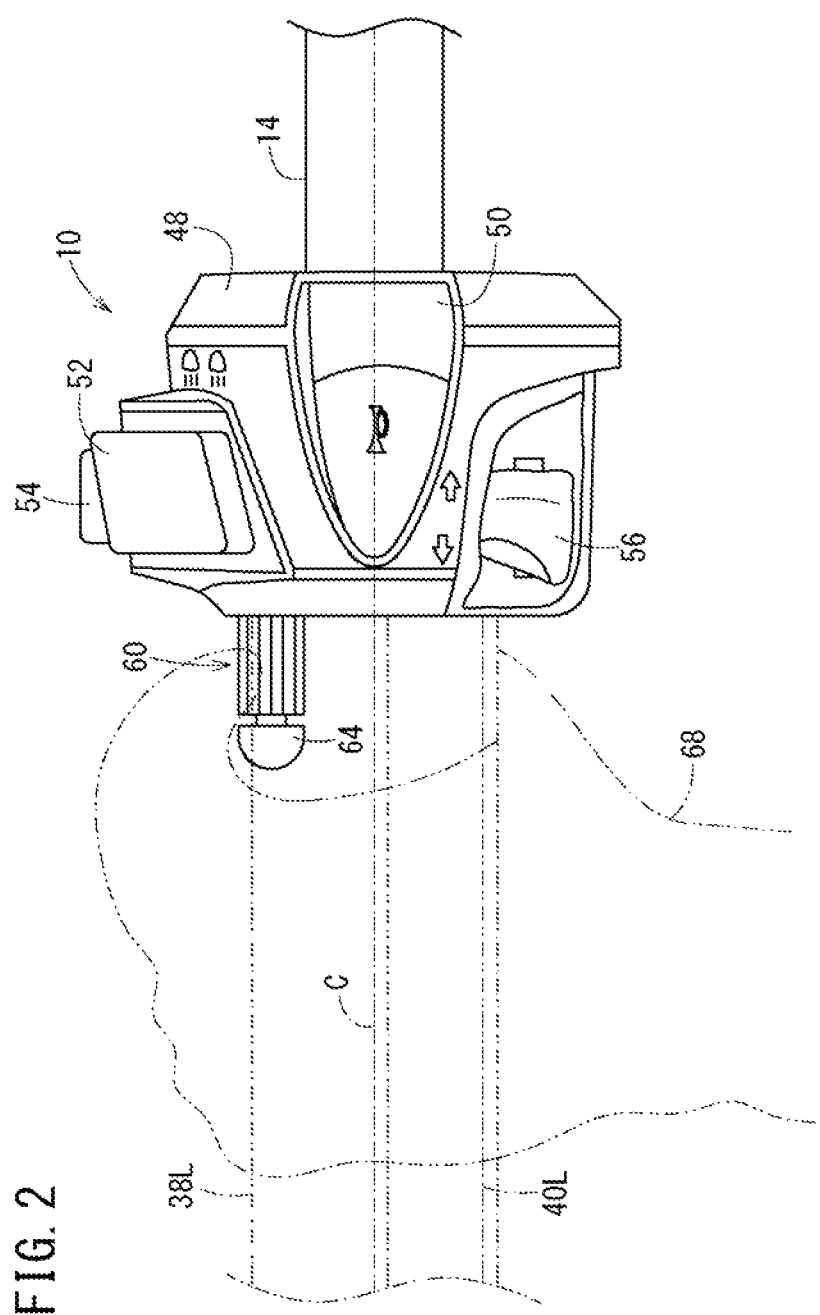
FIG. 2 is a back side view of the operating device shown in FIG. 1.
Figure 3:
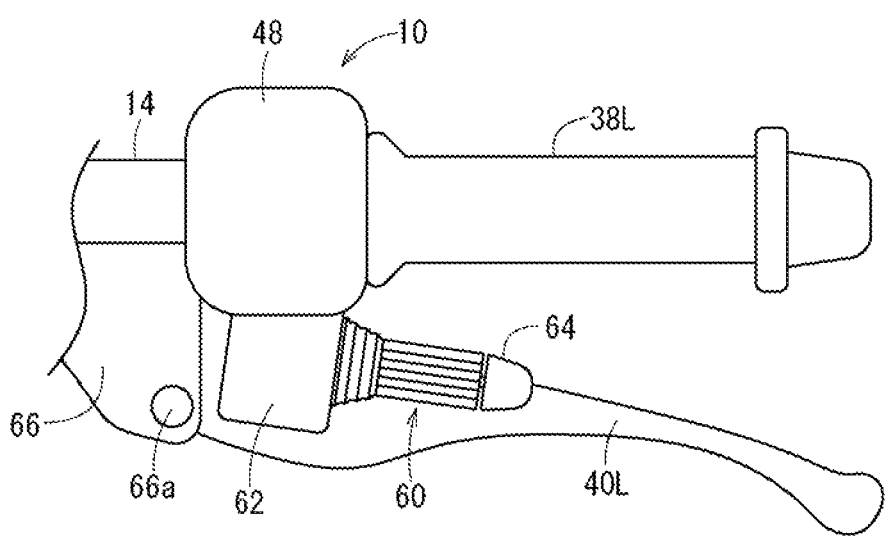
FIG. 3 is a plane view of the operating device shown in FIG. 1.

Moreover, the operating device 10 of the present invention is provided on the left handle bar 14. As shown in FIG. 2 and FIG. 3, a switch box 48 provided inside of the handle bar grip 38L so as to be adjacent to the handle bar grip 38L so as to be adjacent to the handle bar grip 38L is provided on the left handle bar 14. Switches for various electric equipment is provided on the switch box 48. In detail, a horn switch 50, a light axis shifting switch 52, a hazard lamp switch 54, and a blinker switch 56, and the likes are provided. Moreover, the illustrations of the switches for various electric equipment provided on the switch box 48 is omitted in FIG. 3.

The horn switch 50 is a pressing type switch for sounding an unillustrated horn of the straddle type vehicle 12. The horn switch is arranged at the approximately and vertically same level of the vehicle body relative to an axis line C (the center shaft of the handle bar 14) of the handle bar grip 38L. The light axis shifting switch 52 is a seesaw type switch for switching an unillustrated head light of the straddle type vehicle 12 between low beam and high beam and is disposed above the horn switch 50. The hazard lamp switch 54 is a lock type alternate switch for blinkering an unillustrated hazard lamp of the straddle type vehicle 12, which can switch the on/off state by projecting and receding the hazard lamp switch 54. The hazard lamp switch 54 is disposed on the front direction side of the light axis shifting switch 52. The blinker switch 56 is a switch for operating an unillustrated direction indicator (blinker lamp) of the straddle type vehicle 12 by the operation tilting the switch to the right and left, and is disposed below the horn switch 50. Moreover, the direction indicator may be used as the hazard lamp.

In addition, the operating device 10 has a controller 60 for selecting an arbitrary function menu from the plurality of function menus of the equipment including the navigation system 30 and the audio unit 32 and the like. The controller 60 is also used for selecting the function menu to switch the display menus displayed on the meter device 18 and to display a setting menu of the vehicle. The controller 60 is supported on the controller supporting portion 62. The controller supporting portion 62 is disposed on the front direction side of the switch box 48. The controller supporting portion 62 is integrally provided with the switch box 48.

The controller 60 extends to the outside of the handlebar grip 38L in the axial direction and has a joy stick type controller operating portion 64 which the rider can operate. The controller 60 is configured such that the controller operating portion 64 is supported on the controller supporting portion 62 so as to be positioned in the front direction of the handle bar grip 38L. Namely, at least a part of the controller operating portion 64 is disposed on the further outside in the axis direction of the handle bar grip 38L in the axial direction than the controller supporting portion 62. Accordingly, the rider can operate the controller operating portion 64 by a forefinger of a left hand 68 while grasping the left handle bar grip 38L. In the first embodiment, the controller operating portion 64 is formed so as to be extended obliquely frontward from the front direction side of the switch box 48 to the outside of the handle bar grip 38L in the axial direction.

Moreover, the controller operating portion 64 is positioned above the clutch lever 40L, and at least a part of or all of the controller operating portion is positioned above the axis line (shaft center) C of the handle bar grip 38L. Accordingly, the operability of the controller operating portion 64 is further improved. Moreover, as shown in FIG. 3, the clutch lever 40L is rotatably supported on a clutch lever supporting portion 66 provided on the handle bar 14. The clutch lever 40L rotates around a rotation shaft 66a of the supporting portion 66.

Figure 4:
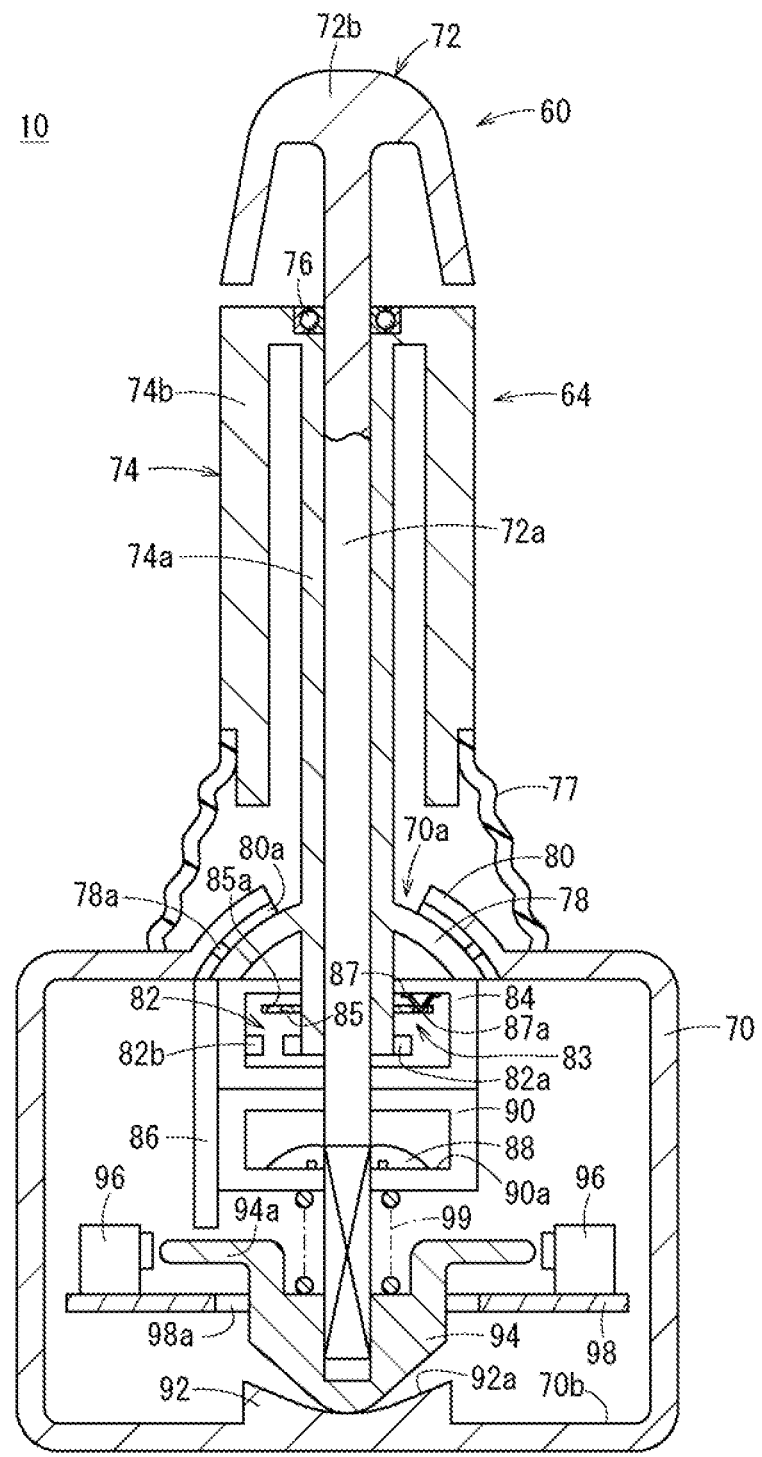
FIG. 4 is a sectional view showing the configuration of the controller.

FIG. 4 is the sectional view showing the configuration of the controller. The controller 60 has the controller operating portion 64, and a holding portion 70 holding the controller operating portion 64 so as to be operable. The controller operating portion 64 has a tilting operating portion 72 by which the rider can operate tilting, and a rotation operating portion 74, which is provided around the tilting operating portion 72 and by which the rider can operate the rotation. The holding portion 70 is supported on the controller supporting portion 62 so as to be covered. Moreover, the holding portion 70 may be directly used for the controller supporting portion 62 as an exterior parts. The tilting operating portion 72 has a tilting shaft 72a, and a tip covering portion (tilting operating controller) 72b which is a part of the controller formed in an approximately hemisphere so as to cover the tip portion of the tilting shaft 72a. The rotation operating portion 74 is formed so as to be penetrated by the tilting shaft 72a, covers a hollow rotation shaft 74a which is rotatable relative to the tilting shaft 72a and the outer periphery surface of the rotation shaft 74a, and has a cylindrical operating portion (rotation controller) 74b which has a cylindrical shape and which is a part of the controller operated by the rider. The rotation shaft 74a and the cylindrical operating portion 74b are continuously connected in the tip side (the outer direction side of the vehicle). The rotation shaft and the cylindrical operating portion are opened in the base end side (the inside of the vehicle). A seal bearing 76 is provided on the tip side of the rotation shaft 74a so as to prevent water and dust from entering the clearance between the rotation shaft 74a and the tilting shaft 72a, and simultaneously, so as to make the rotation shaft 74a rotatable relative to the tilting shaft 72a. Moreover, the tilting shaft 72a can slide to the axis direction relative to the rotation shaft 74a.

The base end sides of the tilting shaft 72a and the rotation shaft 74a are inserted into the holding portion 70 which has a cylindrical box shape. The cylindrical operating portion 74b is provided between the tip covering portion 72b and the holding portion 70. The tilting shaft 72a is inserted deeper into the holding portion 70 comparing to the rotation shaft 74a. The radius of the base end of the tip covering portion 72b is as long as the radius of the cylindrical operating portion 74b. Accordingly, the design effect is improved. A reference numeral 77 shows a bellows-type seal rubber. The seal rubber 77 prevents water and dust from entering the clearance formed between the base end of the cylindrical operating portion 74b and the holding portion 70, and is provided on an area from the base end side of the cylindrical operating portion 74b to the holding portion 70.

The rotation shaft 74a has a hemisphere 78 inside the holding portion 70. A hemisphere 80 formed so as to receive the spherical surface of the hemisphere 78 is formed on the holding portion 70. The hemisphere 80 is formed around an insertion hole 70a of the holding portion 70 into which the tilting shaft 72a and the rotation shaft 74a are inserted. The hemispheres 78, 80 are formed for supporting the tilting operating portion 72 so as to be tiltable. A pin 78a is provided on the spherical surface of the hemisphere 78. A groove 80a with which the pin 78a is engaged is provided on the inner surface of the hemisphere 80. Due to the fact that the pin 78a moves within the groove 80a, the tilting operating portion 72 tilts within the predetermined area. Moreover, as the tilting operating portion 72 tilts, the rotation operating portion 74 tilts together. As a result, whole of the controller operating portion 64 tilts. Namely, the rider can operate to tilt the rotation operating portion 74 by the finger which is stretched to the rotation operating portion, without changing.

A holding member 84 is provided on the lower portion of the rotation shaft 74a. For holding a rotation angle sensor 82 to detect the rotation angle of the rotation shaft 74a (rotation operating portion 74). The rotation angle sensor 82 is provided below the hemisphere 78. The rotation angle sensor 82 is configured with South Pole and North Pole of magnets 82a provided on the outer periphery below the rotation shaft 74a; and a hall element 82b which is a magneto metric sensor provided on the holding member 84. The hall element 82b detecting the magnetic variation of the magnet 82a can detect the rotation angle of the rotation shaft 74a. A signal detected by the hall element 82b is externally output through a substrate 86.

Moreover, a click mechanism 83 is provided on the lower portion of the rotation shaft 74a so as to generate a click sense at every constant angle interval during the rotating operation by the rotation operating portion 74. The click sense (click touch) means a sound and a response and the like generated when the switch is pressed. The click mechanism 83 has a circular flange portion 85 provided on the lower portion of the rotation shaft 74a; and a plate spring 87. A flange portion 85 and a plate spring 87 are provided so as to be opposite to each other. The flange portion 85 is provided on the rotation shaft 74a. Accordingly, the flange portion 85 rotates together as the rotation shaft 74a (rotation operating portion 74) rotates. The plate spring 87 is installed on the holding member 84.

A plurality of opening portions 85a are provided on the outer periphery end portion of the flange portion 85 such that the opening portions are formed so as to penetrate along the outer periphery surface of the flange portion 85. The plurality of opening portions 85a are provided so as to draw a circle around the center of the circular flange portion 85 as a reference point at every constant angle. The plate spring 87 has a projecting portion 87a which is formed in a convex shape from the center to the flange portion 85.

When the opening portion 85a of the flange portion 85 is opposite to the projecting portion 87a, the projecting portion 87a is inserted into the opening portion 85a. When the other portions of the flange portion 85 other than the opening portion 85a is opposite to the projecting portion 87a, the projecting portion 87a is pressed against the biasing force of the plate spring 87. Accordingly, the rotation of the rotation shaft 74a (rotation operating portion 74) generates the click sense by the plate spring 87 at every constant angle.

Moreover, a holding member 90 holding a metal spring piece 88 is provided below the holding member 84. The holding member 84, 90 is installed on the substrate 86 provided along the axial direction of the tilting shaft 72a. The metal spring piece 88 applying the biasing force to the tip side of the tilting shaft 72a in the axial direction relative to the tilting shaft 72a. A contact point is formed on the surface 90a of the holding member 90 which is opposite to the metal spring piece 88. When the tip covering portion 72b of the tilting operating portion 72 is pressed toward the axial direction (from the tip side to the base end side) and the tilting shaft 72a slides relative to the rotation shaft 74a, the metal spring piece 88 becomes flat, and the contact point formed on the surface 90a conducts electricity. Accordingly, the contact signal is externally output through the substrate 86. Namely, the tilting operating portion 72 (controller operating portion 64) functions as a push-button. Moreover, when the controller operating portion 64 is pressed along the axial direction of the tilting shaft 72a, a predetermined clearance is provided between the base end of the tip covering portion 72b and the tip of the cylindrical operating portion 74b such that the tip covering portion 72b cannot interfere with the cylindrical operating portion 74b.

A supporting portion 92 having a sliding surface 92a bending in a bowl-shape and supporting the tilting shaft 72a so as to be tillable is provided on a bottom surface 70b of the holding portion 70 such that the supporting portion A sliding portion 94 abutted on the sliding surface 92a is provided on the base end portion of the tilting shaft 72a which penetrates the holding members 84, 90. Namely, when the tilting shaft 72a tilts, the sliding portion 94 slides the sliding surface 92a. The sliding portion 94 has a flange portion 94a which extends outwardly centering the tilting shaft 72a. A pressing type button 96 is disposed opposite to the flange portion 94a in the cross direction. The button 96 is mounted on a substrate 98. Therefore, the button 96 disposed in the tilting direction is pressed by tilting the controller operating portion 64 to the cross direction, and the contact signal is externally output through the substrate 98.

Moreover, a hole 98a is formed on the substrate 98 so as to prevent the interference with the sliding portion 94. The tip portion of the sliding portion 94 penetrates the hole 98a and abuts on the sliding surface 92a. Moreover, a spring 99 is provided between the sliding portion 94 and the holding member 90. The spring 99 generates a returning force for maintaining the tilting shaft 72a in a vertical posture (initial posture) by pressing the sliding portion 94 to the sliding surface 92a which forms a slope.

As above mentioned, the controller 60 is configured such that the controller operating portion 64 can tilt to the cross direction, and rotate, and function as a pressing button. The controller 60 has a selection operating function for scrolling the function menu and to the direction of proceeding with the selected function menu and to the direction of returning the selected function menu by the rider's operation to select the first direction and or the second direction. In detail, the function menu to be selected can be scrolled and changed by the rotation of the controller operating portion 64 (rotation operating portion 74) and to the first direction and the second direction which are opposite rotational directions to each other.

Furthermore, the controller 60 can operate the controller operating portion 64 to the third direction other than the first and second directions and have a determination operating function which determines the selected function menu. In detail, the selected function menu can be determined by tilting the controller operating portion 64 to any one of the cross direction or pressing the controller operating portion 64 to the axial direction toward the holding portion 70 side.

Figure 5:
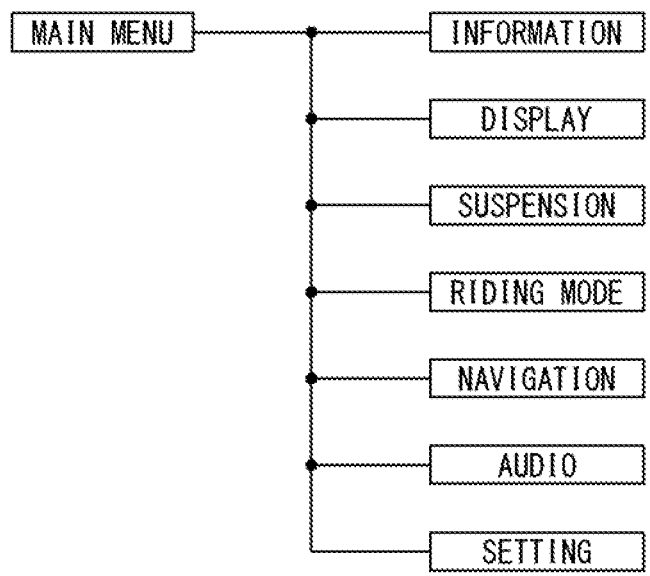
FIG. 5 is a drawing showing a hierarchical function menu of the components including the navigation system and the audio unit displayed on the display portion.

FIG. 5 is a drawing showing the hierarchical function menu of the equipment including the navigation system 30 and the audio unit 32 and the like which are displayed on the display portion 30a. While a "MAIN MENU" which is a function menu displayed on the display portion 30a is selected, when the controller operating portion 64 is operated to the third direction while a "MAIN MENU", which is a function menu displayed on the display portion 30a, is selected, the selection of the "MAIN MENU" is determined. When the selection of the "MAIN MENU" is determined, including "INFORMATION", "DISPLAY", "SUSPENSION", "RIDING MODE", "NAVIGATION", "AUDIO", and "SETTING", which are lower-level function menus than the "MAIN MENU" are displayed on the display portion 30a.

"INFORMATION" is a function menu for displaying the various information regarding to traveling. "DISPLAY" is a function menu for changing the display menu displayed on the meter device 18. "SUSPENSION" is a function menu for displaying the setting information related to suspension including the damping force and the vehicle height. "RIDING MODE" is a function menu for displaying a states related to output characteristics of the engine including a power travelling mode and a rainy-day travelling mode and the like. "NAVIGATION" is a function menu for displaying the various information by the navigation system 30. "AUDIO" is a function menu for displaying the audio information. "SETTING" is a function menu for displaying the setting states of the various equipment.

Then, cursor positions showing the selected function menu are scrolled by operating and rotating the rotation operating portion 74 of the controller operating portion 64. For example, as the rotation operating portion 74 is rotated to the first direction, the cursor position is scrolled forward through the function menus, i.e. in the order of: "INFORMATION"→"DISPLAY"→"SUSPENSION"→"RIDING MODE"→"NAVIGATION"→"AUDIO"→"SETTING"→"INFORMATION". On the contrary, as the rotation operating portion 74 is rotated to the second direction, the cursor position is scrolled backward though the function menus, i.e. in the order of: "INFORMATION"→"SETTING"→"AUDIO"→"NAVIGATION"→"RIDING MODE"→"SUSPENSION"→"DISPLAY"→"INFORMATION". The cursor position changes according to the rotation angle detected by the rotation angle sensor 82. Namely, the displayed cursor position changes every time the rotation angle sensor 82 detects rotation at a predetermined angle.

When the controller operating portion 64 is operated to the third direction while any of "INFORMATION", "DISPLAY", "SUSPENSION", "RIDING MODE", "NAVIGATION", "AUDIO", and "SETTING" is selected, the information of the selected function menu is displayed.

Moreover, the controller 60 may have an operation function for returning to the home screen (initial screen) of the function menu by operating the controller operating portion 64 to the fourth direction other than the first to third directions. For example, if the third direction is set as the direction to which the controller operating portion 64 is tilted, the fourth direction may be the direction to which the controller operating portion 64 is pressed to the holding portion 70 side. Furthermore, when the third direction and the fourth direction are set as the direction to which the controller operating portion 64 is tilted to the cross direction, the third direction and the fourth direction should be set as the different tilting directions. The display portion 30a or the screen displayed on the meter device 18 returns to the home screen by operating the controller operating portion 64 to the fourth direction.

As mentioned-above, in the first embodiment, the controller operating portion 64 of the controller 60, is positioned at the different position from the plurality of switches provided on the switch box which are ordinarily used on the straddle type vehicle 12. Accordingly, it is possible to prevent the rider from confusing operation of the plurality switches in the switch box 48 with controller operating portion 64.

The controller operating portion 64 is positioned in the front direction of the grip portion 38L. Accordingly, if the rider stretches at least one of the fingers which grasp the grip portion 38L forward, the rider can operate the controller operating portion 64 while grasping the grip portion 38L with the other finger and the palm.

The controller operating portion 64 is positioned in the front direction of the other grip portion 38L which is on the opposite side to the grip portion 38R as the highly-used acceleration controller. Accordingly, the operation for selecting the function menus can be facilitated. The controller operating portion 64 is positioned above the clutch lever 40L. Accordingly, the rider can easily operate and easily confirm the controller operating portion 64 despite existence of the existence of the clutch lever 40L. As the controller supporting portion 62 can be integrally provided with the switch box 48, the controller supporting portion 62 can be efficiently formed.

The controller 60 has the selection operating function for scrolling the function menu to forward through the function menus and to backward through the function menus. Accordingly, the rider can select the function menu in accordance with the rider's senses, which facilitate selecting the function menu. The controller 60 has the determination operating function which determines the selected function menu. Accordingly, the rider can determine the function menu by the finger which selected the function menu, without changing.

Figure 6:
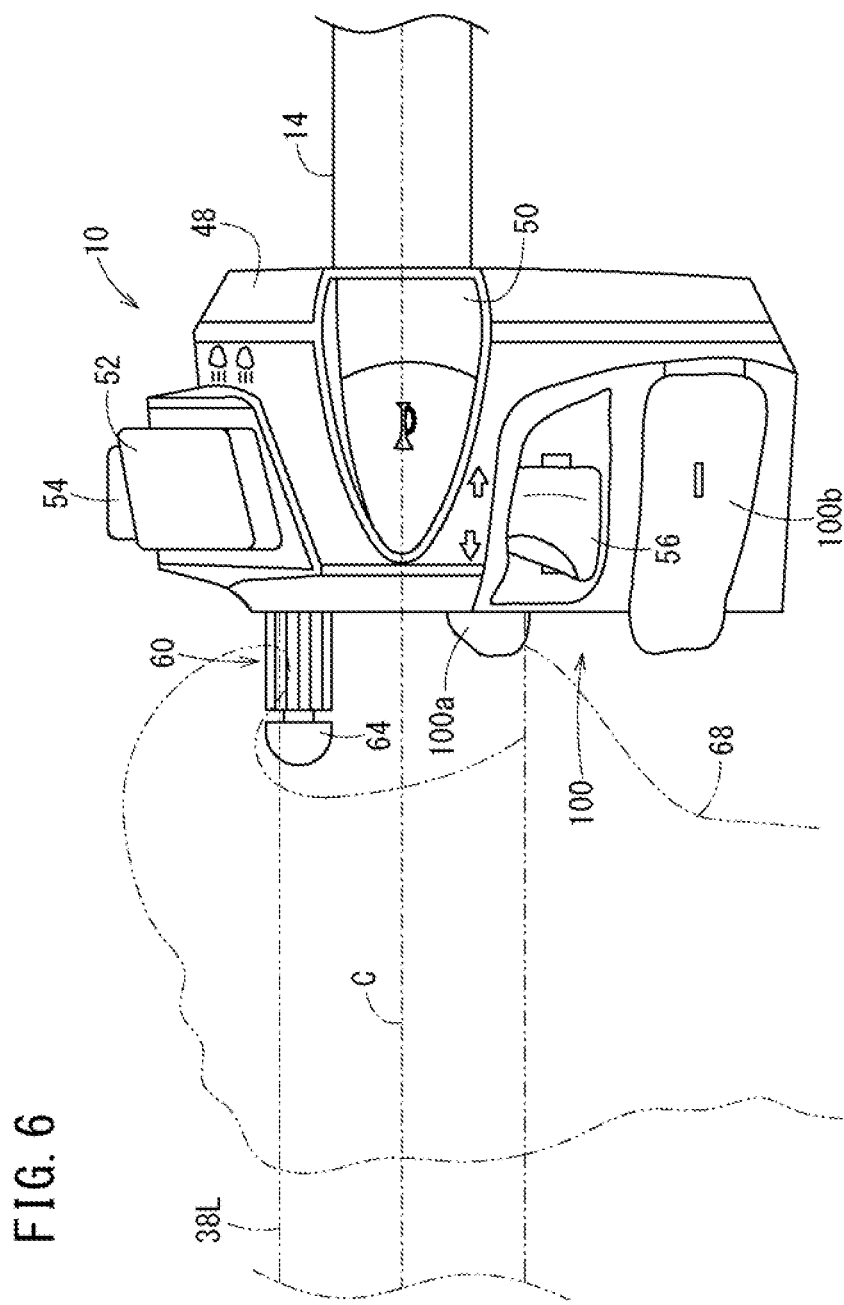
FIG. 6 is aback side view of the operating device in the second embodiment.
Figure 7:
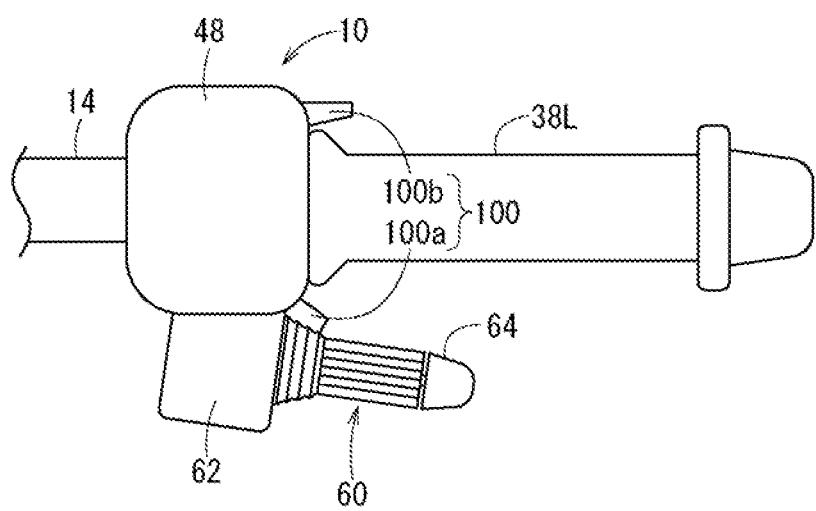
FIG. 7 is a plane view of the operating device in the second embodiment.

According to the second embodiment, the straddle type vehicle 12 assumed to be a vehicle on which the rider cannot manually operate for connecting and disconnecting transmission of the drive force of the driving source to the speed change gear. Namely, when the gears are shifted, the drive force of the driving source is automatically connected and disconnected to the speed change gear. Accordingly, in the second embodiment, as shown in FIG. 6 and FIG. 7, the clutch lever 40L is not provided. Moreover, in the second embodiment, as for the configuration which has the same function as the above-mentioned first embodiment, the same reference numerals are given and the explanations thereof will be omitted unless it is especially necessary. In FIG. 7, the illustrations of the switches for various electric components provided on the switch box 48 are omitted.

In the second embodiment, the operating device 10 has a shift instruction switch 100 for shifting the gears of the transmission by the rider's operation. The electric signal (control signal) corresponding to the rider's operation of the shift instruction switch 100 (gear shift indication) shifts the gears of the transmission. The shift instruction switch 100 has a shift up switch 100a for shifting the gear of the transmission to the high speed side and a shift down switch 100b for shifting the gear of the transmission to the low speed side. If the shift up switch 100a is operated once, the gear of the transmission shifts up. The shift down switch 100b is operated once, the gear of the transmission shifts down.

The shift instruction switch 100 is provided below the controller operating portion 64 and on the switch box 48. In detail, the shift up switch 100a is provided in the front direction of the switch box 48 such that the tip of the shift up switch is projected outward from the surface in the handle bar grip 38L side of the switch box 48. The rider can shift the gears of the transmission to the high speed side by pressing the tip portion of the shift up switch 100a with the forefinger while grasping the handle bar grip 38L. Moreover, the shift down switch 100b is provided in the rear direction of the switch box 48 and below the blinker switch 56. The tip portion thereof is provided so as to project outward from the surface in the handle bar grip 38L side of the switch box 48. The rider can shift the gears of the transmission to the low speed side by pressing the tip portion of the shift down switch 100b with the thumb while grasping the handle bar grip 38L.

According to the second embodiment, there is no need to provide the clutch lever 40L as mentioned in the first embodiment. Accordingly, in addition to the effect made by the above-mentioned first embodiment, the controller operating portion 64 increases the flexibility in the arrangement. Moreover, as the shift instruction switch 100 is provided below the controller operating portion 64 and in the vicinity of the handle bar grip 38L, the shift instruction switch 100 can be provided such that the rider does not confuse the operation of the shift instruction switch with the operation of the operation for the controller operating portion 64.

Figure 8:
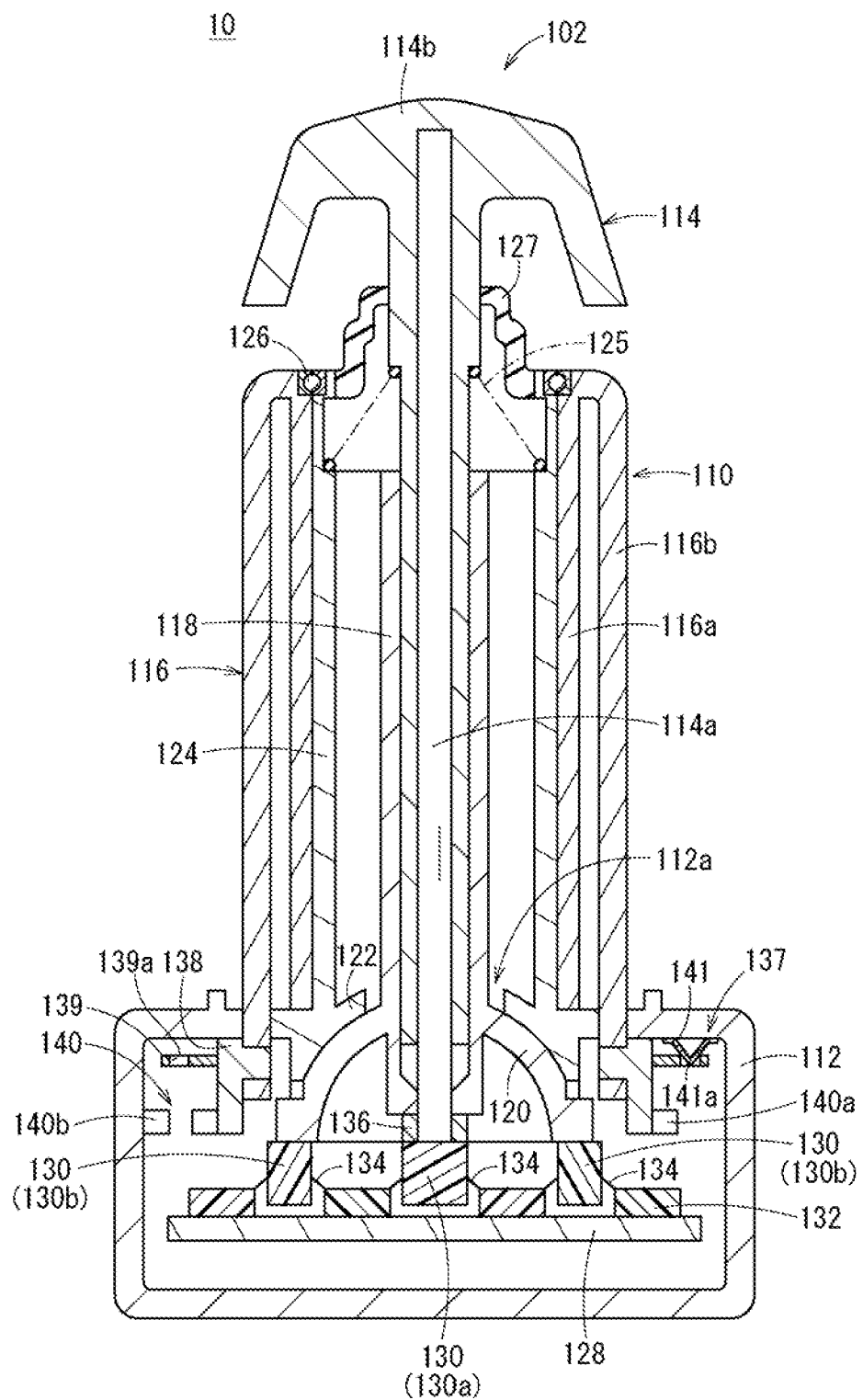
FIG. 8 is a sectional view showing the configuration of the controller in the third embodiment.

The operating device 10 in the above-mentioned first and second embodiments has the controller 60 with the configuration shown in FIG. 4. In a third embodiment, the operating device 10 has a controller 102 with a configuration shown in FIG. 8 instead of the controller 60. Hereinafter, the controller 102 will be explained in detail.

The controller 102 has a joy stick type controller operating portion 110, and a holding portion 112 holding the controller operating portion 110 so as to be operable. The controller operating portion 110 has a tilting operating portion 114 by which the rider can operate tilting, and a rotation operating portion 116 by which the rider can operate the rotation. The holding portion 112 is supported on the controller supporting portion 62 as explained in the above-mentioned first embodiment so as to be covered. Moreover, the holding portion 112 may be directly used for the controller supporting portion 62 as an exterior parts. The tilt operating portion 114 has a tilting shaft 114a, and a tip covering portion (tilt controller) 114b which is apart of the controller formed in an approximately hemisphere so as to cover the tip portion of the tilting shaft 114a.

The tilting shaft 114a slidably penetrates a cylindrical portion 118 in the axial direction. The base end sides of the tilting shaft 114a and the cylindrical portion 118 are inserted into the holding portion 112 which has a cylindrical box shape. A hemisphere 120 is provided on the cylindrical portion 118 inside the holding portion 112. A spherical receiving portion 122 is formed on the holding portion 112 so as to receive the spherical surface of the hemisphere 120. The spherical receiving portion 122 is formed around an insertion hole 112a of the holding portion 112 into which the tilting shaft 114a of the holding portion and the cylindrical portion 118 are inserted. The hemisphere 120 and the spherical receiving portion 122 are used for slidably supporting tilting the operating portion 114.

The hollow cylindrical portion 124 is provided on the holding portion 112 so as to extend upward from the portion of the spherical receiving portion 122. Accordingly, the tilting shaft 114a can slide in the hollow space of the cylindrical portion 124. Moreover, a spring 125 is provided between the cylindrical portion 124 and the sliding shaft 114a for maintaining the tilting shaft 114a in a vertical posture (initial posture).

The cylindrical portion 124 rotatably supports the rotation operating portion 116. The rotation operating portion 116 is formed such that the cylindrical portion 124 penetrates the rotation operating portion, and has a hollow rotation shaft 116a which is rotatable relative to the cylindrical portion 124; and a cylindrical operating portion (rotation operating controller) 116b and which is a part of the controller operated by the rider, and covers the outer periphery surface of the rotation shaft 116a. The rotation a cylindrical shape which covers the outer periphery surface of the rotation shaft 116a, the rotation shaft 116a and the cylindrical operating portion 116b are continuously connected at the tip side, the base end side thereof are opened. A seal bearing 126 is provided on the tip side of the rotation shaft 116a so as to prevent water and dust from entering the clearance between the rotation shaft 116a and the cylindrical portion 124, and simultaneously, so as to make the rotation shaft 116a rotatable relative to the cylindrical portion 124. A bellows-type seal rubber 127 for preventing water and dust from entering the clearance is provided between the base end side of the cylindrical portion 124 and the tilting shaft 114a. The radius of the base end of the tip covering portion 114b is as long as the radius of the cylindrical operating portion 116b. Accordingly, the design effect is improved.

A substrate 128 is provided inside the holding portion 112. Flexible seats 132 on which a plurality of buttons 130 are formed are layered on the upper surface of the substrate 128. The plurality of buttons 130 are integrally formed on the upper portions of domes 134 provided so as to be projected above the seats 132. The contact point formed on the substrate 128 conducts electricity by pressing the buttons 130. Accordingly, the contact signal is externally output through the substrate 128. The art of the button 130 is known as the conventional one.

The button 130 formed on the seat 132 has a button 130a disposed below the tilting shaft 114a and four buttons 130b disposed below the edge of the opening end of the hemisphere 120. The four buttons 130b disposed below the edge of the opening end of the hemisphere 120 are arranged in a cross shape. The button 130b in the tilted direction is pressed by tilting the operating portion 114 to the cross direction. Moreover, by pressing the tilting operating portion 114 to the axial direction toward the holding portion 112, the tilting shaft 114a slides relative to the cylindrical portion 118, and then the button 130a is pressed. Moreover, a retaining ring 136 is fitted to the base end of the tilting shaft 114a. Moreover, when the controller operating portion 110 is pressed along the axial direction of the tilting shaft 114a, a predetermined clearance is provided between the base end of the tip covering portion 114b and the tip of the cylindrical operating portion 116b such that the tip covering portion 114b cannot interfere with the cylindrical operating portion 116b.

The base end portion of the cylindrical operating portion 116 is inserted into the holding portion 112. A retaining portion 138 for retaining the rotation operating portion 116 is engaged with the base end portion of the cylindrical operating portion 116b. A rotation angle sensor 140 detecting the rotation angle of the rotation operating portion 116 is provided inside the holding portion 112. The rotation angle sensor 140 is configured with South Pole and North Pole of magnets 140a provided on the outer periphery of the retaining portion 138; and a hall element 140b which is a magneto metric sensor provided on the holding member 112. The hall element 140b detecting the magnetic variation of the magnet 140a can detect the rotation angle of the rotation operating portion 116 (retaining portion 138). A signal detected by the hall element 140b is externally output through the substrate 128.

Moreover, a click mechanism 137 is provided inside the holding portion 112 so as to generate the click sense at every constant angle during the rotating operation of the rotation operating portion 116. The click mechanism 137 has a circular flange portion 139 provided on the retaining portion 138; and a plate spring 141. The flange portion 139 and the plate spring 141 are provided so as to be opposite to each other. The flange portion 139 rotates together as retaining portion 138 rotates. The plate spring 141 is installed on the inside wall of the holding member 112.

A plurality of opening portions 139a are provided on the outer periphery end portion of the flange portion 139 such that the opening portions 139a are formed so as to penetrate along the outer periphery surface of the flange portion 139. The plurality of opening portions 139a are provided so as to draw a circle around the center of the circular flange portion 139 as a reference point at every constant angle. The plate spring 141 has a projecting portion 141a which is formed in a convex shape from the center to the flange portion 139.

When the opening portion 139a of the flange portion 139 is opposite to the projecting portion 141a, the projecting portion 141a is inserted into the opening portion 139a. When the other portions of the flange portion 139 other than the opening portion 139a are opposite to the projecting portion 141a, the projecting portion 141a is pressed against the biasing force of the plate spring 141. Accordingly, the rotation of the retaining portion 138 (rotation operating portion 116) generates a click sense by the plate spring 141 at a every constant angle.

As above mentioned, the controller 102 is configured such that the controller operating portion 110 can tilt to the cross direction, and rotate, and function as a pressing button. The controller operating portion 110 has a selection operating function for scrolling the function menu of proceeding with the selected function menu and to the direction of returning the selected function menu by operating the controller operating portion 110 to the first direction and to the second direction. In detail, the function menu to be selected can be scrolled and changed by the rotation of the controller operating portion 110 (rotation operating portion 116) to the first direction and the second direction.

Furthermore, the controller 102 have a determination operating function which determines the selected function menu by operating the controller operating portion 110 to the third direction other than the first and second directions. In detail, the selected function menu can be determined when the rider tilts the controller operating portion 100 to any one of the cross direction or pressing the controller operating portion 110 (tilting operating portion 114) to the axial direction toward the holding portion 112 side.

Moreover, the controller 102 may have an operation function for returning to the home screen (initial screen) of the function menu by operating the controller operating portion 110 to the fourth direction other than the first to third directions. For example, if the third direction is set as the direction to which the controller operating portion 110 (tilting operating portion 114) is tilted, the fourth direction may be the direction to which the controller operating portion 110 (tilting operating portion 114) is pressed to the holding portion 112 side. Furthermore, in case that the third direction and the fourth direction are set as the directions to which the controller operating portion 110 (tilting operating portion 114) is tilted to the cross direction, the third direction and the fourth direction may be set differently.

The third embodiment can achieve the same effect as the above-mentioned first and second embodiments.

Figure 9:
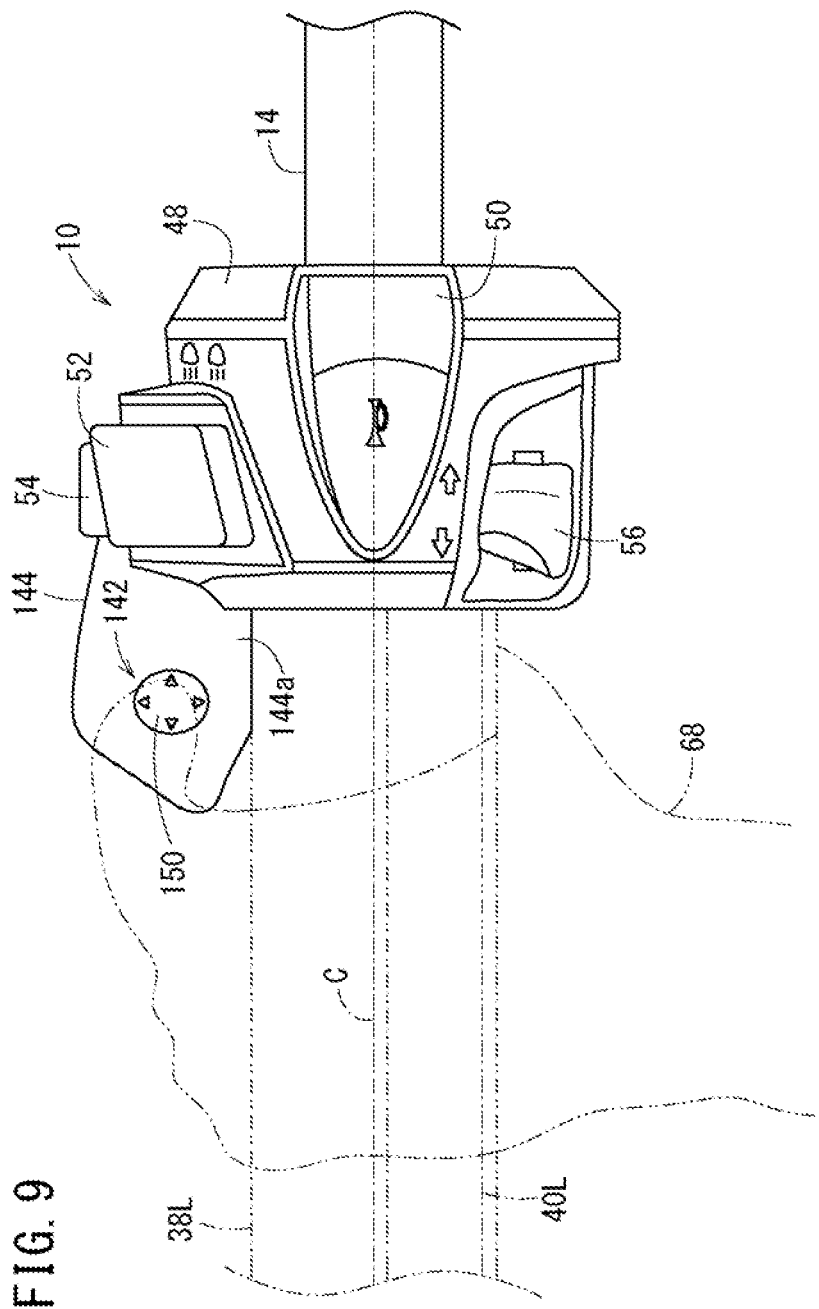
FIG. 9 is aback side view of the operating device in the fourth embodiment.
Figure 10:
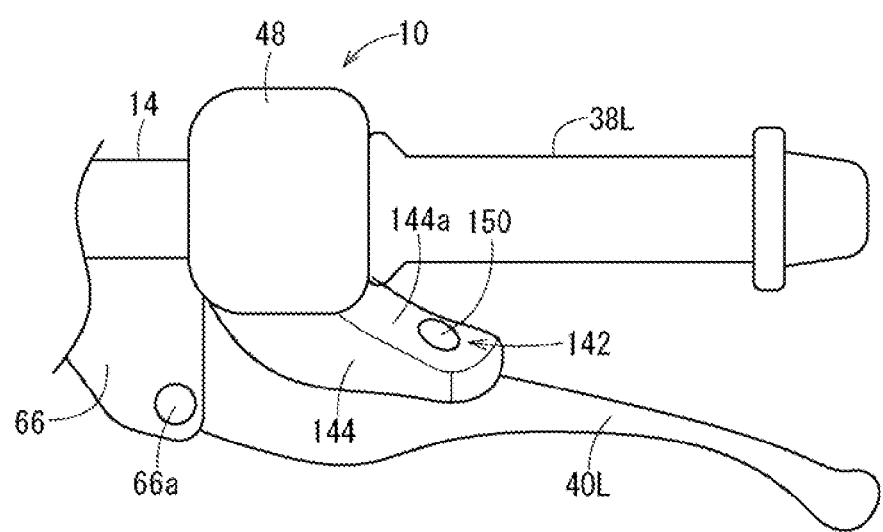
FIG. 10 is a plane view of the operating device in the fourth embodiment.

In the fourth embodiment, the operating device 10 has a controller 142 and a controller supporting portion 144 instead of the controller 60 and the controller supporting portion 62 shown in FIG. 9 and FIG. 10. Hereinafter, the controller 142 and the controller supporting portion 144 will be explained in detail. Moreover, in the fourth embodiment, as for the configuration which has the same function as the above-mentioned first embodiment, the same reference numerals are given and the explanations thereof will be omitted unless special needs. In FIG. 10, the illustrations of the switches for various electric components provided on the switch box 48 are omitted.

The controller operating portion 144 supporting the controller 142 is formed so as to be projected obliquely frontward from the front direction side of the switch box 48 to the outside in the axial direction of the handle bar grip 38L. The controller 142 has a joy stick type controller operating portion 150. The controller operating portion 150 is provided on a surface 144a side of the controller supporting portion 144 which is opposite to the handle bar grip 38L. Accordingly, the controller operating portion 150 is supported by the controller supporting portion 144 so as to be positioned in the front direction of the handle bar grip 38L. Accordingly, the rider can operate the controller operating portion 150 by the forefinger of the left hand 68 while grasping the handle bar grip 38L by the forefinger of the left hand 68. Moreover, the surface 144a of the controller supporting portion 144 is formed so as to face obliquely upward to the rear direction. Accordingly, the controller operating portion 150 can be provided so as to face obliquely upward to the rear direction. Then, the operability of the controller operating portion 150 can be further improved while grasping the handle bar grip 38L.

Moreover, the controller supporting portion 144 is integrally provided with the switch box 48. Furthermore, the controller operating portion 150 is positioned above the clutch lever 40L and above the axis line C of the handle bar grip 38L. Accordingly, the operability of the controller operating portion 150 can be further improved.

Figure 11:
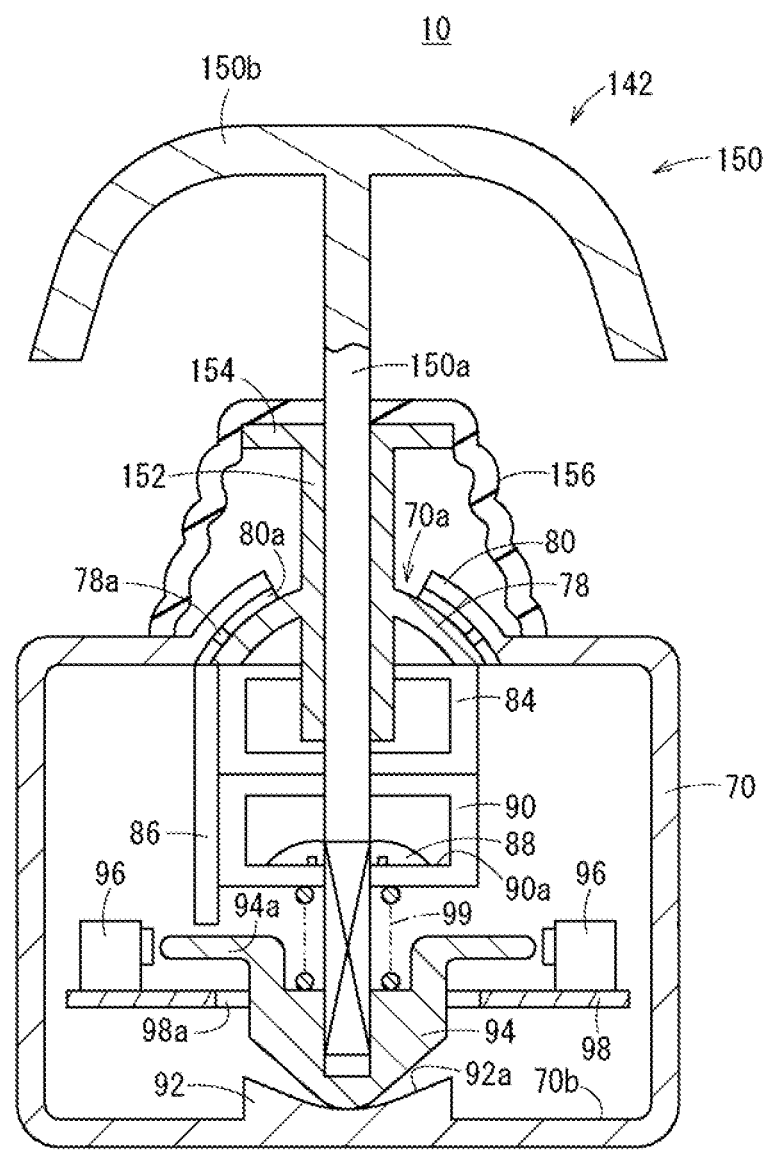
FIG. 11 is a sectional view showing the configuration of the controller in the fourth embodiment.

FIG. 11 is a sectional view showing the configuration of the controller 142 in the fourth embodiment. In principle, the controller 142 has the basically same configuration as the above-mentioned first embodiment of the controller 60. In the fourth embodiment, the controller operating portion 150 is different from the one in the above-mentioned first embodiment in term of the inability of rotational operation. Namely, the controller operating portion 150 can operate the tilting operation and functions as a pressing button in the fourth embodiment. Accordingly, the controller operating portion 150 does not have the rotation operating portion 74 in the above-mentioned first embodiment.

The controller operating portion 150 is an equivalent to the tilting operating portion 72 in the above-mentioned first embodiment, and has a tilting shaft 150a and a tip covering portion (tilting controller) 150b as a controller formed in an approximately hemisphere so as to cover the tip portion of the tilting shaft 150a. The tilting shaft 150a and the tip covering portion 150b are equivalents to the tilting shaft 72a and the tip covering portion 72b in the above-mentioned first embodiment. The tilting shaft 150a penetrates a cylindrical portion 152. The base end sides of the tilting shaft 150a and the cylindrical portion 152 are inserted into the holding portion 70. The tilting shaft 150a is slidable relative to the cylindrical portion 152. Moreover, a flange 154 is formed on the tip of the cylindrical portion 152. A bellows-type seal rubber 156 is provided from the tip of the cylindrical portion 152 to the holding portion 70 so as to cover the flange 154.

Among the hemisphere 78, 80 tiltably supporting the controller operating portion 150 of the hemisphere 78 is provided on the cylindrical portion 152 inserted into the holding portion 70. The hemisphere 80 is formed around the insertion hole 70a of the holding portion 70 as explained in the above-mentioned first embodiment. The sliding portion 94 having the flange portion 94a which abuts on the sliding surface 92a of the supporting portion 92 is provided on the base end portion of the tilting shaft 150a. Accordingly, the button 96 disposed in the tilting direction is pressed by tilting the controller operating portion 150 to the cross direction, and the contact signal is externally output through the substrate 98.

The metal spring piece 88 provided on the holding member 90 applies the biasing force to the tip side in the axial direction of the tilting shaft 150a relative to the tilting shaft 150a. When the controller operating portion 150 is pressed along the axial direction of the tilting shaft 150a, the metal spring piece 88 becomes flat, and the contact point formed on the surface 90a conducts electricity. Accordingly, the contact signal is externally output through the substrate 86. Moreover, as shown in FIG. 9 and FIG. 10 the controller 142 is held such that the controller supporting portion 144 conceals the seal rubber 156 and the holding portion 70 and the tip covering portion 150b is exposed in the fourth embodiment. Moreover, the holding portion 70 may be used for the controller supporting portion 70 as an exterior component.

In the fourth embodiment, the function menu to be selected can be scrolled to the advance direction and changed by the rotation of the controller operating portion 150 to the first direction and the second direction to the return direction. It is preferable that the first direction and the second direction are opposite each other. For example, it is preferable that the controller 150 tilts upward as the first direction, and tilts downward as the second direction.

Moreover, the selected function menu can be determined by operating the controller operating portion 150 to the third direction other than the first and second directions. The third direction may set as the direction to which the controller operating portion 150 is tilted, or the direction to which the controller operating portion 150 is pressed in the axial direction toward the holding portion side.

The fourth embodiment can achieve the same effect as the above-mentioned first embodiment.

Figure 12:
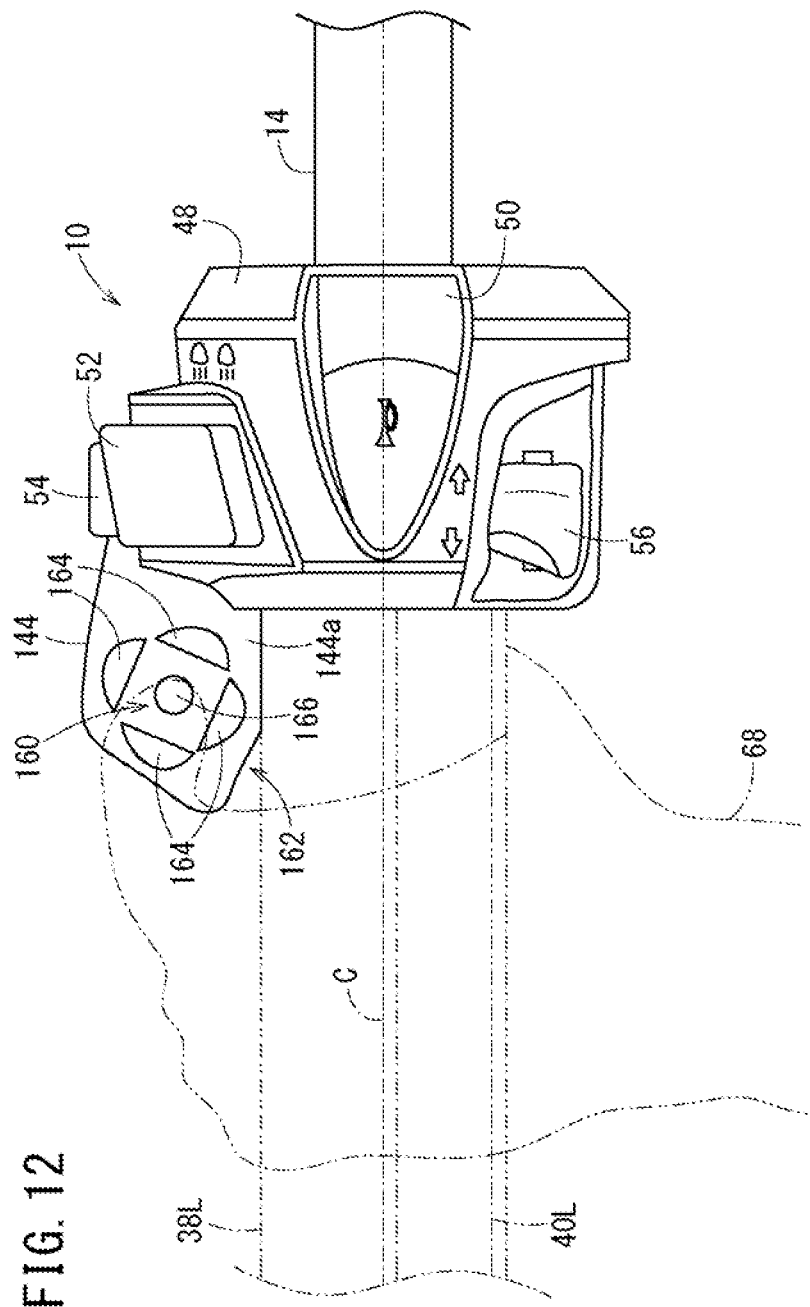
FIG. 12 is a plane view of the operating device in the fifth embodiment.

In a fifth embodiment, the operating device 10 has a controller 162 with a button-type controller operating portion 160 shown in FIG. 12 instead of the controller 142 with the joystick-type controller operating portion 150 in the above-mentioned fourth embodiment. Moreover, in the fifth embodiment, as for the configuration which has the same configuration as the above-mentioned fourth embodiment, the same reference numerals are given and the explanations thereof will be omitted unless necessary.

The controller operating portion 160 is provided on the surface 144a side of the controller supporting portion 144 which is opposite to the handle bar grip 38L. Accordingly, the controller operating portion 160 is supported by the controller supporting portion 144 so as to be positioned in the front direction of the handle bar grip 38L. Accordingly, the rider can operate the controller operating portion 160 while grasping the handle bar grip 38L by the forefinger of the left hand 68. The controller operating portion 160 is positioned above the clutch lever 40L and above the axis line C of the handle grip 38L. Accordingly, operability of the controller operating portion 160 can be improved.

The controller operating portion 160 has four buttons (controllers) 164 disposed in the cross direction, namely, vertically and horizontally, and oppositely disposed, and a button (controller) 166 disposed in the center of the four buttons 164. In the fifth embodiment, the function menu to be selected can be scrolled to the advance direction and changed by pressing the one predetermined button 164 (hereinafter, the first button 164) among the four buttons 164 of the controller operating portion 160. Moreover, the function menu to be selected can be scrolled and changed by pressing the one predetermined button 164 (the second button 164) other than the first button 164. It is preferable that the first button 164 and the second button 164 among the four buttons 164 disposed in the cross direction are the buttons 164 oppositely disposed each other. For example, it is preferable that the buttons 164 are vertically and oppositely disposed. Moreover, the selected function menu can be determined by pressing the center button 166 of the controller operating portion 160 as the third button. The controller 162 may have the operation function for returning to the home screen (initial screen) of the function menu by pressing the button other than the first and second buttons 164 as the fourth button 164.

The fifth embodiment can achieve the same effect as the above-mentioned first embodiment.

Figure 13:
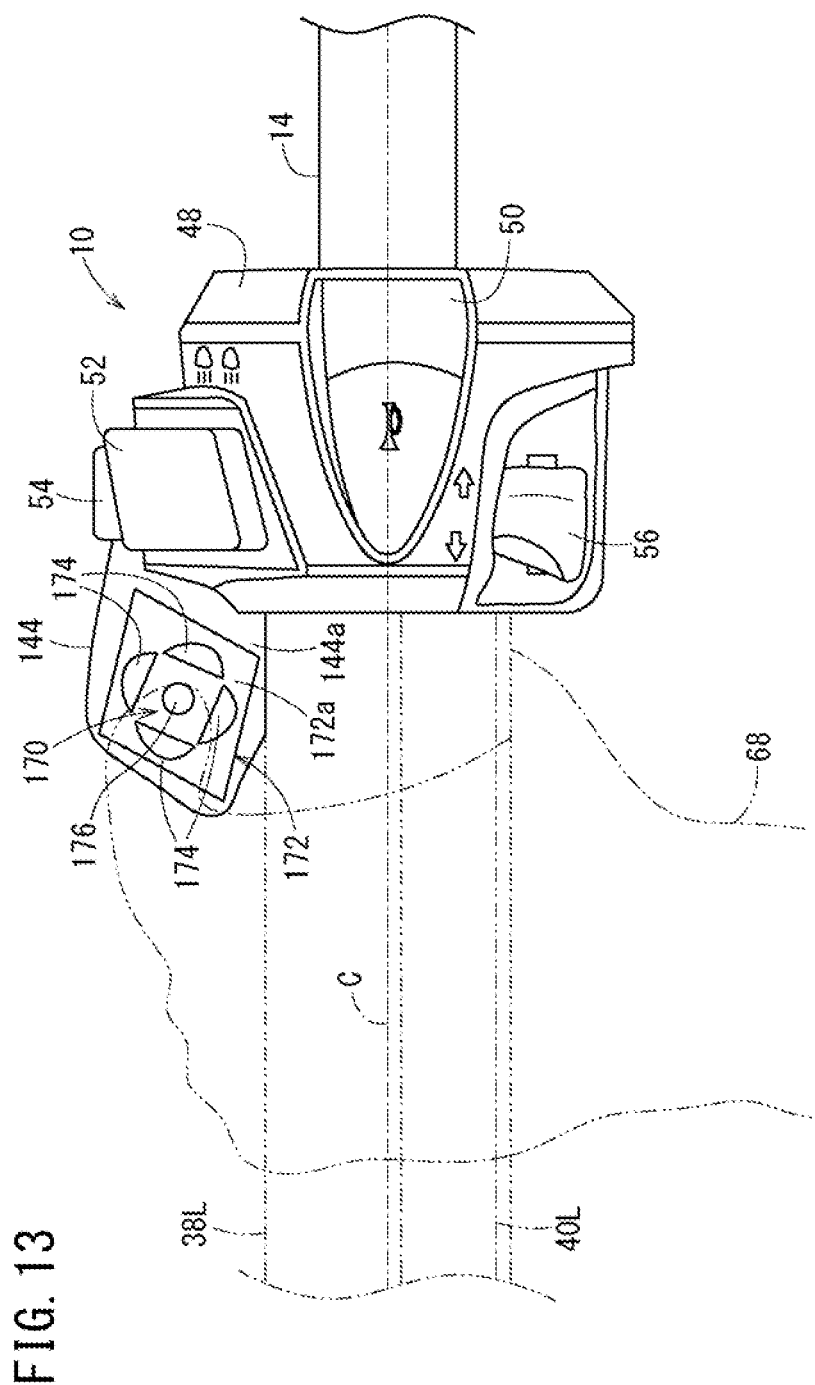
FIG. 13 is a plane view of the operating device in the sixth embodiment.

In a sixth embodiment, the operating device 10 has a controller 172 with a controller operating portion 170 shown in FIG. 13 instead of the controller 142 with the joystick-type controller operating portion 150 in the above-mentioned fourth embodiment. Moreover, in the sixth embodiment, as for the configuration which has the same configuration as the above-mentioned fourth embodiment, the same reference numerals are given and the explanations thereof will be omitted unless necessary.

The controller 172 has a touch-panel type liquid crystal display 172a. The controller operating portion 170 is configured so as to be displayed on the liquid crystal display 172a. The controller operating portion 170 has four buttons (controllers) 174 disposed in the cross direction, namely, vertically and horizontally, and oppositely disposed, and a button (controller) 176 disposed in the center of the four buttons 174. Namely, the controller operating portion 170 is configured with the buttons 174, 176 are displayed on the liquid crystal display 172a.

The crystal liquid display 172a of the controller 172 is provided on the surface 144a side of the controller supporting portion 144 which is opposite to the handle bar grip 38L. Accordingly, the controller operating portion 170 is supported on the controller supporting portion 144 so as to be positioned in the front direction of the handle bar grip 38L. Then, the rider can operate the controller operating portion 170 while grasping the handle bar grip 38L by the forefinger of the left hand 68. The controller operating portion 170 is positioned above the clutch lever 40L and above the axis line C of the handle bar grip 38L. Accordingly, the operability of the controller operating portion 170 can be improved.

In the sixth embodiment, the function menu can be scrolled to the advance direction and changed by pressing the one predetermined button 174 (hereinafter, the first button 174) among the four buttons 174 of the controller operating portion 170. Moreover, the function menu to be selected can be scrolled to the rear direction and changed by pressing the one predetermined button 174 (the second button 174) other than the first button 174. In the sixth embodiment, it is preferable that the first button 174 and the second button 174 among the four buttons 174 disposed in the cross direction are the buttons 174 oppositely disposed each other. For example, it is preferable that the buttons 174 are vertically and oppositely disposed. Moreover, the selected function menu can be determined by pressing the center button 176 of the controller operating portion 170. Furthermore, the controller 172 may have the operation function for returning to the home screen (initial screen) of the function menu by pressing the button 174 other than the first and second buttons 174 as the fourth button 174.

The sixth embodiment can achieve the same effect as the above-mentioned first embodiment. Moreover, the touch panel without the display function may display the buttons for touch control.

Figure 14:
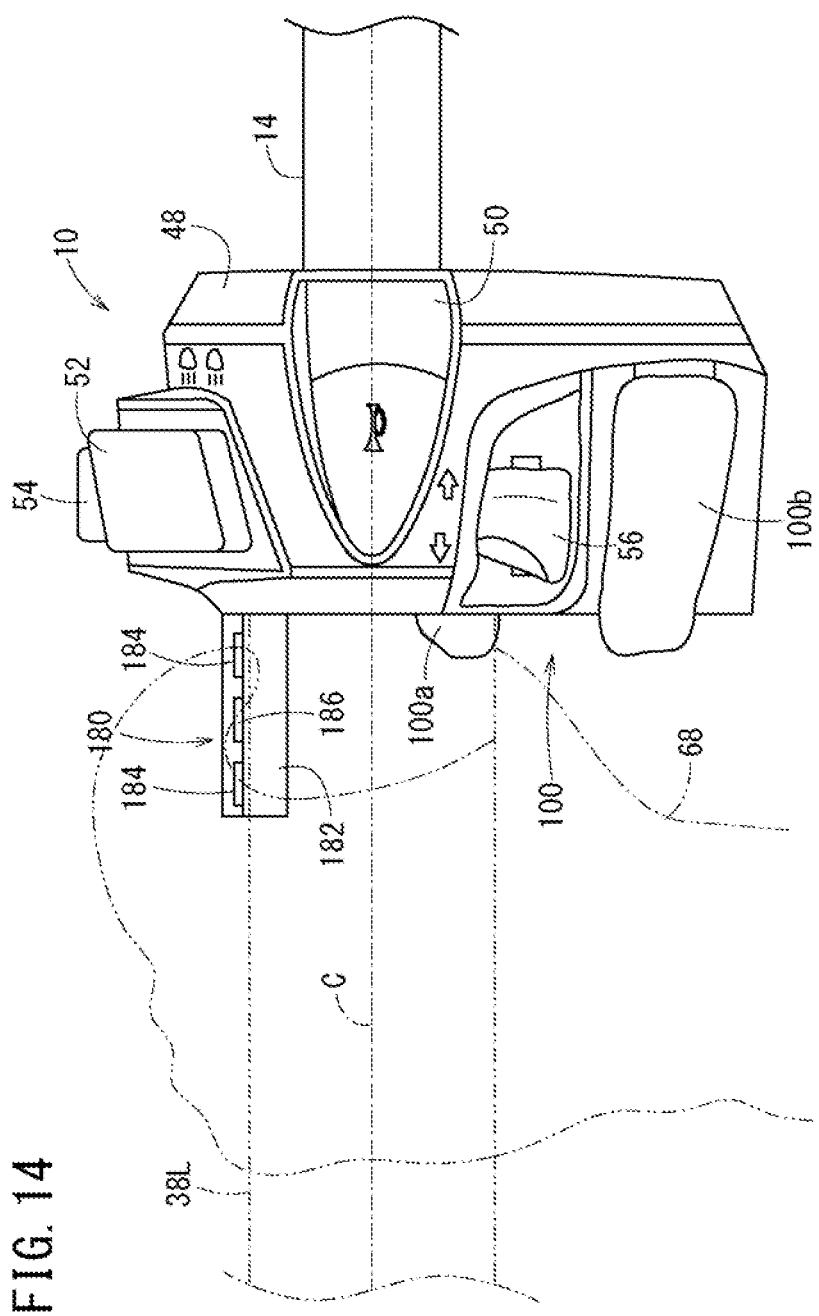
FIG. 14 is a back side view of the operating device in the seventh embodiment.
Figure 15:
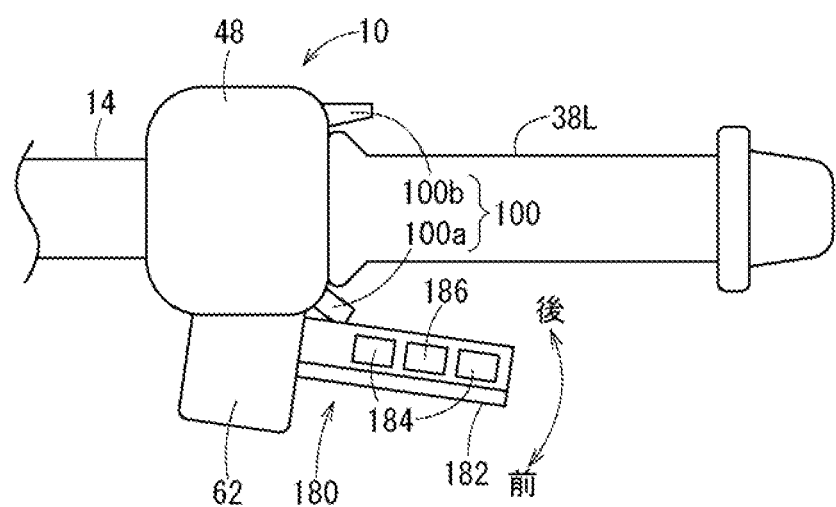
FIG. 15 is a plane view of the operating device in the seventh embodiment.

In a seventh embodiment, the operating device 10 has a controller 180 shown in FIG. 14, FIG. 15, instead of the controller 60 explained in the above-mentioned second embodiment, as for the configuration which has the same function as the above-mentioned second embodiment, the same reference numerals are given and the explanations thereof will be omitted unless necessary.

The controller 180 has a controller operating portion (controller) 182 extending to the right and left direction (the axial direction of the handle bar 14) of the vehicle and slidably tilting to the front and rear direction. The controller operating portion 182 has two buttons (controllers) 184 in a rectangular parallelepiped shape provided on the upper surface along the axial direction, and a button (controller) 186 provided between the two buttons 184. The controller 180 is supported on the controller supporting portion 62 such that the controller operating portion 182 is positioned in the front direction of the handle bar grip 38L. In the seventh embodiment, the controller operating portion 182 is formed so as to be projected obliquely frontward from the front direction side of the switch box 48 to the outside in the axial direction of the handle bar grip 38L.

At least a part of the controller operating portion 182 is disposed on the outside in the axial direction of the handle bar grip 38L than the controller supporting portion 62. Accordingly, the rider can operate the controller operating portion 182 by a part of the left hand 68 (for example, the forefinger or the forefinger and the ring finger) while grasping the left handle bar grip 38L. Moreover, at least a part or all of the controller operating portion 182 is positioned above the clutch lever 40L and above the axis line C of the handle bar grip 38L. Accordingly, the operability of the controller operating portion 182 can be improved.

In the seventh embodiment, the function menu to be selected can be scrolled and changed by pressing any one of the button 184 (for example, the right button 184) among the two buttons 184 of the controller operating portion 182. Moreover, the function menu can be scrolled to the return direction and changed by pressing the other button 184 (for example, the left button 184). Then, the function menu to be selected can be determined by tilting the controller operating portion 182 to the front direction or the rear direction or the front and rear direction. Moreover, the center button 186 is used for returning to the home screen of the function menu.

The seventh embodiment can achieve the same effect as the above-mentioned second embodiment.

Figure 16:
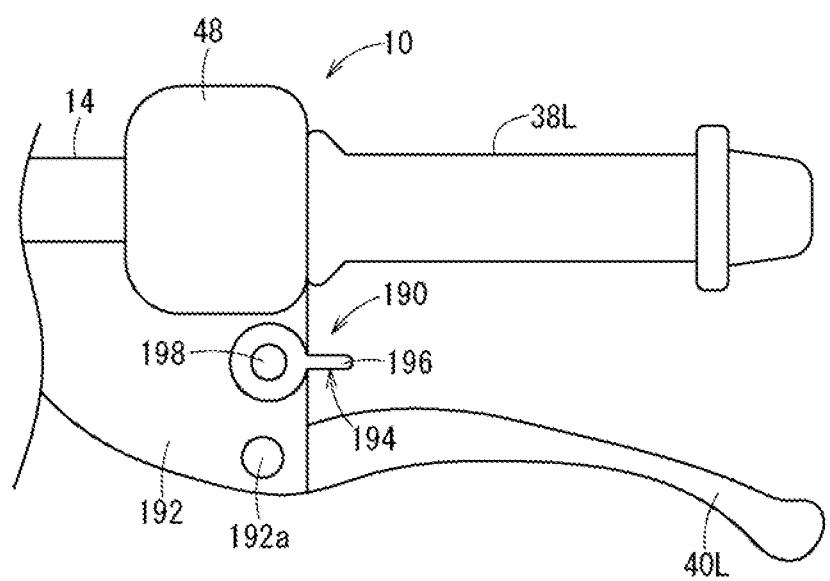
FIG. 16 is a plane view of the operating device in the eighth embodiment.

In an eighth embodiment, the operating device 10 has a controller 190 and a controller operating portion 192 shown in FIG. 16 instead of the controller 60 and the controller operating portion 62 explained in the above-mentioned first embodiment. Moreover, in the eighth embodiment, as for the configuration which has the same configuration as the above-mentioned first embodiment, the same reference numerals are given and the explanations thereof will be omitted unless necessary.

The controller supporting portion 192 is provided on the handle bar 14, and supports the controller 190, and rotatably supports the clutch lever 40L. The clutch lever 40L rotates around the rotation shaft 192a of the controller supporting portion 192. At least a part of the controller supporting portion 192 is disposed in the front direction of the switch box 48. The clutch lever 40L is rotatably supported on the controller supporting portion 192 in the front direction of the switch box 48. The controller 190 has a controller operating portion 194. The controller operating portion 194 has a movement controller (controller) 196 which is movable to the front and rear direction and a button (controller) 198.

The controller 190 is supported on the controller supporting portion 192 such that the controller operating portion 194 is positioned in the front direction of the handlebar grip 38L, and is positioned above the clutch lever 40L. Accordingly, the rider can operate the controller operating portion 194 by the forefinger of the left hand 68 while grasping the handle bar grip 38L. Moreover, at least a part of the controller operating portion 194 is disposed on the outside in the axial direction of the handle bar grip 38L than the controller supporting portion 192.

In the eighth embodiment, the controller 190 is provided on the upper surface of the controller supporting portion 192 in the front direction of the switch box 48 and in the rear direction of the rotation shaft 192a, and on the end portion of the outside in the axial direction of the handle bar grip 38L. And, the movement controller 196 is formed so as to extend from the controller supporting portion 192 to the outside in the axial direction of the handle bar grip 38L. Accordingly, the operability of the movement controller 196 is improved. The button 198 is provided on the upper surface of the controller operating portion 194 in the front direction of the switch box 48. Moreover, at least a part or all of the controller 190 may be positioned above the axis line C of the handle bar grip 38L, which is unillustrated.

In the eighth embodiment, the function menu to be selected can be scrolled to the advance direction and to the return direction and changed by moving the movement operating portion 196 of the controller operating portion 194 to the first direction and the second direction as the front direction and the rear direction. For example, the function menu to be selected can be scrolled and changed to the advance direction by moving the movement operating portion 196 to the front direction as the first direction. The function menu to be selected can be scrolled to the return direction and changed by moving the movement operating portion 196 to the rear direction as the second direction. Moreover, the selected function menu can be determined by pressing the button 198. In the eighth embodiment, the controller supporting portion 192 may be integrally provided with the switch box 48.

The eighth embodiment can achieve the same effect as the above-mentioned first embodiment.

Moreover, the operating device 10 explained in the above-mentioned fourth to sixth, and eighth embodiments may be applied to the straddle type vehicle 12 such that the rider cannot manually operate to connect and disconnect transmission of the drive force of the driving source to the speed change gear. In this case, the shift instruction switch 100 is provided on the switch box 48 as explained in the above-mentioned second embodiment. In such a vehicle which does not require the clutch lever 40L, the controller of the present invention can be disposed easier and can be used effectively. Moreover, the operating device 10 explained in the seventh embodiment may be applied to the straddle type vehicle 12 such that the rider manually operates to connect and disconnect transmission of the drive force to the driving source to the speed change gear. In this case, the operating device 10 does not have the shift instruction switch 100. Instead, the clutch lever 40L as explained in the above-mentioned first embodiment is provided on the handle bar 14.

Description of Reference Numerals:

| | |
|---|---|
| 10 . . . operating device | 12 . . . straddle type vehicle |
| 14 . . . handle bar | 18 . . . meter device |
| 30 . . . navigation system | 30 . . . adisplay portion |
| 32 . . . audio unit | 38L, 38R . . . grip portion (handle bar grip) |
| 40L . . . clutch lever | 42, 48 . . . switch box |
| 60, 102, 142, 162, 172, 180, 190 . . . controller | |
| 62, 144, 192 . . . controller supporting portion | |
| 64, 110, 150, 160, 170, 182, 194 . . . controller operating portion | |
| 66 . . . clutch lever supporting portion 66a, 192a . . . rotation shaft | |
| 72, 114 . . . tilting operating portion | 74, 116 . . . rotation operating portion |
| 100 . . . shift instruction switch | 100a . . . shift up switch |
| 100b . . . shift down switch | 172a . . . liquid crystal display |

The invention claimed is:

1. An operating device of a straddle type vehicle, said operating device comprising:
    switch boxes having a plurality of switches adjacently provided in an inside in an axial direction of grip portions which are provided on right and left ends of a handle bar extending to the right and left direction of the straddle type vehicle, and which are configured to be grasped by a rider;
    controllers configured to select a plurality of function menus of components mounted on the straddle type vehicle;
    controller supporting portion supporting said controllers, said controller supporting portion being disposed in a front direction of said switch boxes, said controllers having controller operating portions configured to be operated by a rider, said controller operating portions being positioned in a front direction of said grip portions,
    wherein the controller supporting portion is integrally provided with said switch boxes.

2. The operating device according to claim 1,
    wherein one grip portion of said grip portions comprises an accelerator controller configured to manually control a vehicle speed, said controller operating portions being positioned in a front direction of another grip portion of said grip portions, which is on an opposite side to said one grip portion as said accelerator controller.

3. The operating device according to claim 2, wherein the straddle type vehicle has a clutch lever positioned in a front direction of said another grip portion by which the rider manually operates for connecting and disconnecting drive force of a driving source to a transmission, and said controller operating portions being positioned above said clutch lever.

4. The operating device according to claim 2,
    wherein said straddle type vehicle comprises a vehicle which automatically connects and disconnects a drive force of a driving source to a transmission, and wherein said controller operating portions are provided in a front direction of a left grip portion of said grip portions.

5. The operating device according to claim 4,
    wherein said straddle type vehicle is configured to shift gears of said transmission under an instruction of an electric signal, and has a shift instruction switch which shifts the gears by a rider's operation said shift instruction switch being said controller operating portions, and in a vicinity of said left grip portion.

6. The operating device according to claim 1,
    wherein said controllers include a selection operating function configured to scroll the function menu to a direction of proceeding with a selected function menu and to a direction of returning the selected function menu by a rider's operation to the first direction and to the second direction.

7. The operating device according to claim 6,
    wherein said controllers are configured to operate to a third direction other than the first and second directions and include a determination operating function which is configured to determine said selected function menu by operation to said third direction.

8. An operating device of a straddle type vehicle, said operating device comprising:
    switch means adjacently provided in an inside in an axial direction of grip portions which are provided on right and left ends of a handle bar extending to the right and left direction of the straddle type vehicle, and which are configured to be grasped by a rider;
    controller means for selecting a plurality of function menus of components mounted on the straddle type vehicle;
    controller supporting means supporting said controller means, said controller supporting means being disposed in a front direction of said switch means, said controller means having controller operating means for being operated by a rider, said controller operating means being positioned in a front direction of said grip portions,
    wherein the controller supporting means is integrally provided with said switch means.

9. The operating device according to claim 8, wherein one grip portion of said grip portions comprises accelerator controller means for manually controlling vehicle speed, said controller operating means being positioned in a front direction of another grip portion of said grip portions, which is on an opposite side to said one grip portion as said accelerator controller means.

10. The operating device according to claim 9, wherein the straddle type vehicle includes a clutch lever positioned in a front direction of said another grip portion by which the rider manually operates for connecting and disconnecting drive force of a driving source to a transmission, and said controller operating means being positioned above said clutch lever.

11. The operating device according to claim 9, wherein said straddle type vehicle comprises a vehicle which automatically connects and disconnects a drive force of a driving source to a transmission, and wherein said controller operating means are provided in a front direction of a left grip portion of said grip portions.

12. The operating device according to claim 11, wherein the straddle type vehicle is configured to shift gears of said transmission under an instruction of an electric signal, and includes a shift instruction switch means for shifting the gears by a rider's operation, said shift instruction means being disposed below said controller operating means and in a vicinity of said left grip portion.

13. The operating device according to claim 8, wherein the controller means includes a selection operating means for scrolling the function menu to a direction of proceeding with a selected function menu and to a direction of returning the selected function menu by a rider's operation to the first direction and to the second direction.

14. The operating device according to claim 13, wherein the controller means are for operating to a third direction other than the first and second directions, wherein said controller means includes a determination operating means for determining said selected function menu by operation to said third direction.

15. The operating device according to claim 8, wherein said switch means comprises a plurality of switches.

* * * * *